H. BROBERG.
FISH STOP.
APPLICATION FILED FEB. 12, 1914.
1,147,301.
Patented July 20, 1915.
2 SHEETS—SHEET 1.
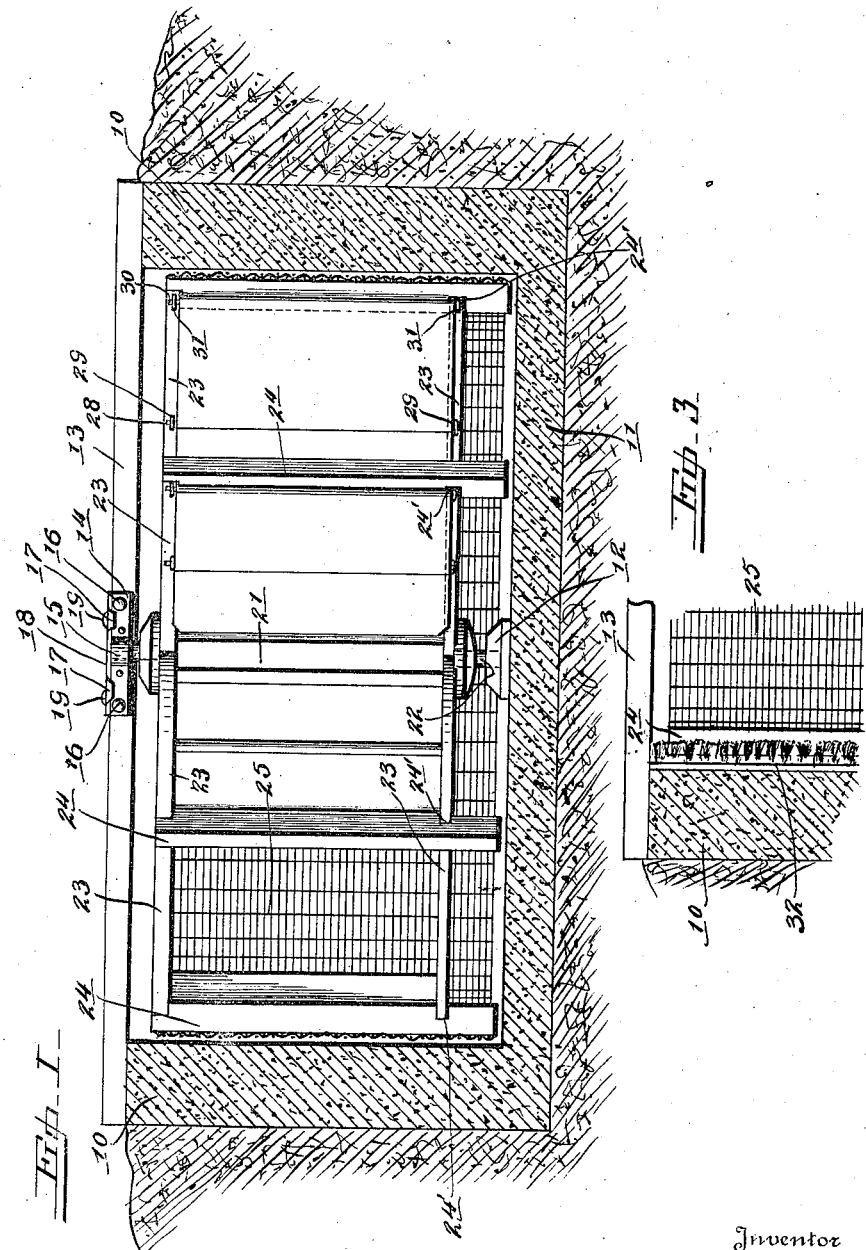
Witnesses
E. S. Hall.
J. C. Woodward.
Inventor
Henry Broberg.
By Richard Bowen,
his Attorney H. BROBERG.
FISH STOP.
APPLICATION FILED FEB. 12, 1914.
1,147,301.
Patented July 20, 1915.
2 SHEETS—SHEET 2.
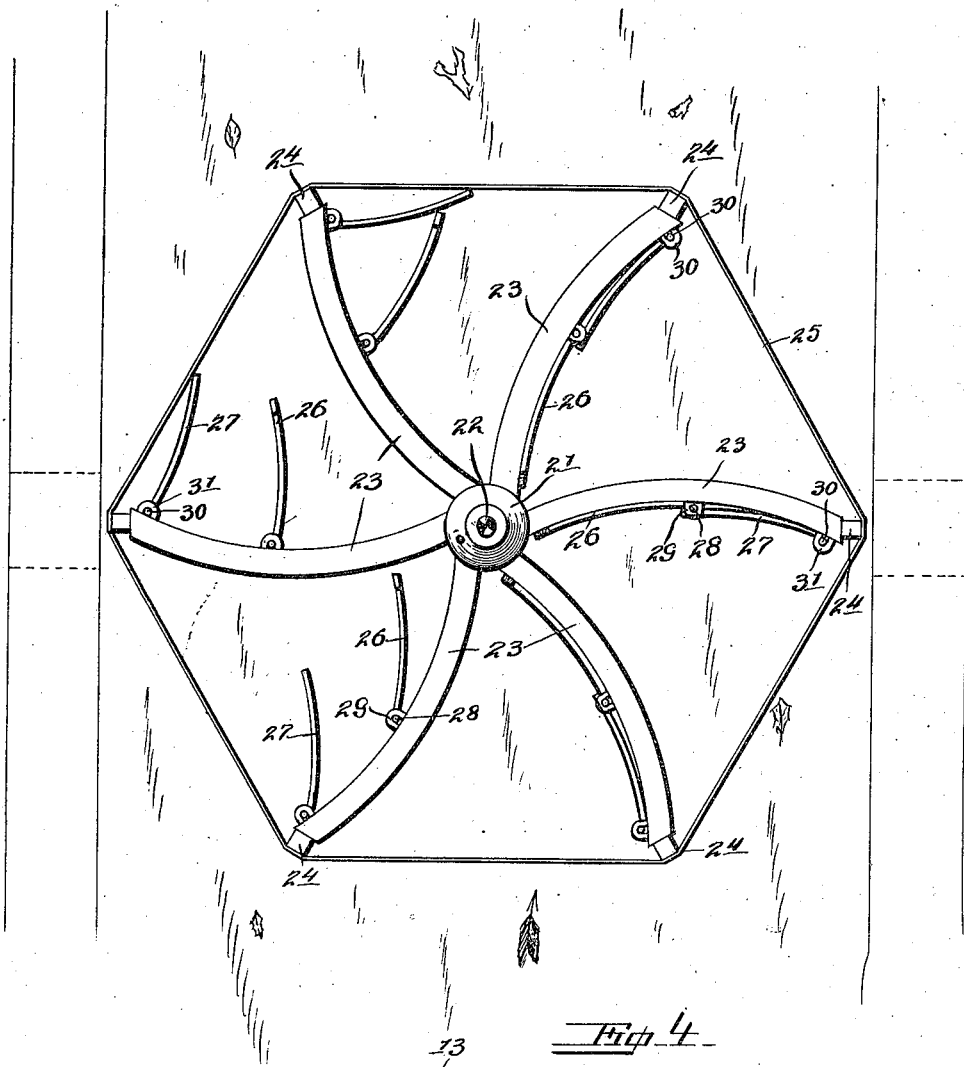
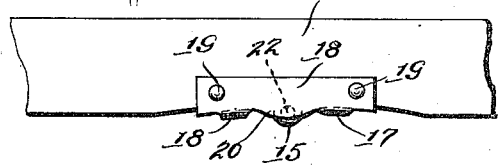
Witnesses
E. S. Hall.
Inventor
Henry Broberg.
By
his Attorney

UNITED STATES PATENT OFFICE.

HENRY BROBERG, OF WARMSPRINGS, MONTANA.

FISH-STOP.

1,147,301.　　　　　Specification of Letters Patent.　　Patented July 20, 1915.

Application filed February 12, 1914. Serial No. 818,336.

*To all whom it may concern:*

Be it known that I, HENRY BROBERG, a citizen of the United States, residing at Warmsprings, in the county of Deerlodge and State of Montana, have invented certain new and useful Improvements in Fish-Stops, of which the following is a specification.

This invention relates to an improved fish stop for irrigation ditches, and the principal object of the invention is to provide a fish stop which is in the form of a water wheel rotatably mounted in the irrigation ditch with its axle extending vertically, the water wheel being rotated by the water passing through the ditch.

Another object of the invention is to provide the water wheel with wire side walls through which the water may freely pass, but which will prevent the fish from passing through the ditch.

Another object of the invention is to provide the water wheel with an improved type of blade-supporting arms which are curved longitudinally so that the blades will receive the greatest amount of action from the water and thus cause the water wheel to operate very efficiently.

This invention is illustrated in the accompanying drawings wherein—

Figure 1 is a transverse sectional view through the irrigating ditch with the water wheel shown in side elevation, the wire screening being partially removed; Fig. 2 is a top plan view of the water wheel, the cross bar which carries a bearing for the upper end of the axle being removed; Fig. 3 is a fragmentary sectional view showing a brush which cleans the wire walls of the water wheel. Fig. 4 is a fragmentary view of the cross bar with the upper bearing in place.

The irrigating ditch is provided with cement sides 10 and a cement bottom 11 upon which there is mounted the lower bearing 12. The cross bar 13 is carried by the side walls 10 and extends transversely across the irrigating ditch. The strip 14 which is provided with a central bearing 15 is secured to the cross bar 13 by means of the bolts or other securing devices 16 and has its upper edge portion engaged by the tongues 17 which extend downwardly from the plate 18. This plate 18 is secured to the upper face of the cross bar by means of the bolts 19 or other securing devices and is provided with a central lip 20 which extends over the bearing 15 to form a cover for the bearing.

The water wheel 10 rotatably mounted in the irrigating ditch has its hub 21 provided with an axle 22 which extends above and below the hub and has upper and lower end portions rotatably mounted in the bearings 12 and 15. The spokes 23 which extend from the upper and lower ends of the hub are positioned in alinement and are curved as shown in Fig. 2. to allow the greatest amount of water pressure upon each of the blades which are carried by the spokes. The outer ends of the spokes 23 are connected by the vertical standards 24 which have their upper ends cut flush with the upper spokes 23 and have their lower end portions extending below the lower spokes and provided with cut-out portions 24' in which the ends of the lower spokes are secured. A screening 25 which forms the side walls for the water wheel is secured to the outer faces of the standards 24 and extends entirely around the water wheel so that fish will be prevented from passing through the water wheel. The screen shown in the drawings has been shown with a relatively large mesh, but it is obvious that the screen could be formed with any suitable size mesh or any suitable shape of mesh.

The blades 26 and 27 are preferably formed of heavy sheet metal and are curved as shown in Fig. 2 so that they will conform to the curvature of the spokes 23 when in the operative position shown at the right of Fig. 2. The inner blades 26 have their pivot pins 28 rotatably connected with the spokes by means of the bearings 29 and the outer blades have their pivot pins 30 rotatably connected with the spokes by means of the bearings 31. The outer blades are of such length that when in the operative position shown in Fig. 2, their free ends will engage the pivot ends of the inner blades 26 and the inner blades are of such height that when in the operative position the upper and lower edges of the inner blades will engage the upper and lower spokes. The outer blades may have their upper and lower edges engaging the spokes.

In the operation of this device the water wheel is mounted as shown in Fig. 1 with the blades connected with the spokes upon the up-stream sides of the spokes as shown at Fig. 2 so that when the water passes through the irrigating ditch in the direction indicated by the arrow in this figure, the water will engage the blades upon the right hand side of the water wheel and move them to a closed position. This provides a solid face for the water to engage thus permitting the water to rotate the water wheel. The blades upon the opposite side of the water wheel will swing to the positions shown so that they will present comparatively no resistance to the position of the water through the water wheel, thus permitting the water wheel to turn freely. It has been already pointed out in the body of the description that by having the spokes of the water wheel curved as shown in Fig. 2 and having the blades curved to conform to the contour of the spokes, the water passing through the irrigating ditch will more readily rotate the water wheel. It will thus be seen that while water may pass through the irrigating ditch, fish will be prevented from passing through the ditch due to the fact that the rotating water wheel will prevent the passage of the fish. If it is desired to keep the screen walls clean from mud or leaves, a brush 32 may be secured upon the stream side of the irrigating ditch to brush against the screen walls and thoroughly remove any dirt or leaves. The water wheel has been mounted with the axle extending vertically since by this arrangement the water wheel can be very easily mounted in the irrigating ditch, the bearing 12, and a bearing carried by the cross bar 13 being all that is necessary in order to rotatably mount the water wheel.

What is claimed is:

1. In a fish stop a rotatably mounted water wheel including a vertically-extending hub, spokes extending from said hub, standards having their upper ends connected with the outer ends of said upper spokes and having their lower ends extending beneath the lower spokes and provided with cut-out portions in which said lower spokes are secured, a perforated wall carried by said standards and plates pivotally connected with said spokes.

2. In an irrigating ditch a bearing in the bottom of said ditch, cross bar extending across said ditch, a plate secured to the side of said cross bar and provided intermediate its length with a bearing positioned above said first-mentioned bearing, a plate secured to the upper face of said cross bar and provided with a lip extending above the bearing secured thereon and being also provided with tongues extending to engage said strip upon opposite sides of the bearing carried thereby, and a water wheel mounted in said ditch and provided with a vertically-extending axle rotatably mounted in said bearings.

3. A device of the character described including a lower bearing, an upper bar, a bearing fitting against said bar, a water wheel positioned beneath said bar and provided with a vertically extending axle rotatably mounted in said bearings, and a securing plate fastened upon the upper face of said bar and provided with tongues extending to engage the bearings carried by said bar to hold said bearings in place.

In testimony whereof I affix my signature in presence of two witnesses.

HENRY BROBERG.

Witnesses:
A. B. ECKERDT,
J. T. RIDINGER.